US009307020B2

(12) United States Patent
Buller et al.

(10) Patent No.: US 9,307,020 B2
(45) Date of Patent: Apr. 5, 2016

(54) DISPERSAL AND RETRIEVAL OF DATA FRAGMENTS IN A PEER-TO-PEER DATA BACKUP AND ARCHIVAL NETWORK

(75) Inventors: Steven J. Buller, Morrisville, NC (US); Richard C. Garrett, Oro Valley, AZ (US); Richard Hutzler, Corona de Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 12/244,767

(22) Filed: Oct. 2, 2008

(65) Prior Publication Data

US 2010/0088269 A1  Apr. 8, 2010

(51) Int. Cl.
*G06F 17/30* (2006.01)
*H04L 29/08* (2006.01)
*H04L 29/06* (2006.01)

(52) U.S. Cl.
CPC ........ *H04L 67/104* (2013.01); *G06F 17/30209* (2013.01); *H04L 67/108* (2013.01); *H04L 67/1076* (2013.01); *H04L 63/0428* (2013.01); *H04L 67/1063* (2013.01); *H04L 67/1068* (2013.01)

(58) Field of Classification Search
CPC . H04L 67/104; H04L 67/108; H04L 67/1076; H04L 67/1063; H04L 67/1068; H04L 63/0428; G06F 17/30209
USPC .......................................... 707/622, 652, 661
See application file for complete search history.

(56) References Cited

U.S. PATENT DOCUMENTS

| | | | |
|---|---|---|---|
| 2003/0070077 A1* | 4/2003 | Redlich et al. ................ | 713/182 |
| 2003/0167408 A1 | 9/2003 | Fitzpatrick et al. | |
| 2005/0108484 A1 | 5/2005 | Park | |
| 2005/0138110 A1 | 6/2005 | Redlich et al. | |
| 2006/0259573 A1* | 11/2006 | Goodman et al. ............ | 709/217 |
| 2007/0079081 A1 | 4/2007 | Gladwin et al. | |
| 2007/0079082 A1* | 4/2007 | Gladwin et al. ............. | 711/154 |
| 2007/0079083 A1* | 4/2007 | Gladwin et al. ............. | 711/154 |
| 2007/0143459 A1* | 6/2007 | Batteram et al. ............. | 709/223 |

OTHER PUBLICATIONS

K. K. To et al., "Decentralized Periodic Broadcasting for Large-Scale Video Streaming", 2005, IEEE, pp. 1-4.*
Chang et al., "Remote Integrity Check with Dishonest Storage Server", Oct. 6, 2008, ACM, pp. 223-237.*

* cited by examiner

*Primary Examiner* — Etienne Leroux
*Assistant Examiner* — Jared Bibbee
(74) *Attorney, Agent, or Firm* — Steven M. Greenberg, Esq.; CRGO Law

(57) ABSTRACT

Embodiments of the present invention address deficiencies of the art in respect to data backup and archival tools and provide a method, system and computer program product for the dispersal and retrieval of fragments in a peer-to-peer data backup and archival network. In an embodiment of the invention, a method for the dispersal and retrieval of fragments in a peer-to-peer data backup and archival network can include partitioning a file into multiple, different fragments for storage in a peer-to-peer data backup and archival network, selecting different peer hosts in the peer-to-peer data backup and archival network to store different ones of the fragments, and storing each of the fragments in at least one of the selected different peer hosts. Optionally, the fragments can be encrypted before storage in the different peer hosts.

17 Claims, 2 Drawing Sheets

DISPERSAL AND RETRIEVAL OF DATA FRAGMENTS IN A PEER-TO-PEER DATA BACKUP AND ARCHIVAL NETWORK

REFERENCE TO CO-PENDING APPLICATIONS FOR PATENT

The present application is related to the following co-assigned U.S. patent applications, which are expressly incorporated by reference herein:

U.S. application Ser. No. 12/244,764, entitled "ENCRYPTION OF DATA FRAGMENTS IN A PEER-TO-PEER DATA BACKUP AND ARCHIVAL NETWORK", filed on Oct. 2, 2008.

U.S. application Ser. No. 12/244,769, entitled "PERIODIC SHUFFLING OF DATA FRAGMENTS IN A PEER-TO-PEER DATA BACKUP AND ARCHIVAL NETWORK", filed on Oct. 2, 2008.

BACKGROUND OF THE INVENTION

1. Field of the Invention

The present invention relates to the field of data backup and archival tools and more particularly to data fragment dispersal about a computer communications network for data backup and archiving.

2. Description of the Related Art

The advent of personal computing revolutionized both the collection and generation of data in the personal and industrial environments. Prior to the widespread adoption of computing, data collection meant paper—lots of it. Data archival and retrieval referred to nothing more than the filing of paper in a filing cabinet indexed for relative ease of retrieval. As the volume of data grew, so too did the physical space requirements for filing cabinets. Data archives of more significant volume necessarily involved microfiche—photographs of data in order to reduce the physical space requirements of filing cabinets. Thus, the evolution of electronic data collection and storage literally saved the world from filing cabinet overpopulation.

The replacement of physical paper with electronic data, however, produced its own set of critical issues. First and foremost, data security remains of paramount importance. That is to say, since unlimited copies of data can be generated with the stroke of a key on a keyboard, it is imperative that only authorized individuals can access electronic data. Further, without data backup no one would rely upon electronic data lest a minor electro-mechanical malfunction of a disk drive result in the loss of critical information. Accordingly, two separate industries focused respectively upon data security and data backup and archival tools arose.

Traditional data backup and archival tools rely upon the principal of redundancy in placing copies of important data in different places so that a malfunction in one data storage medium is of minimal consequence. Advanced data backup and archival tools not only perform periodic backup operations, but also live backup operations in real time with the concurrent writing of data to multiple disk media. Of course, sophisticated data backup and archival tools also implement different degrees of data encryption and access control to effectuate correspondingly different level of data security.

Traditional data backup and archival tools can be expensive not only in the direct cost of software licensing, but also in respect to indirect costs like the establishment and maintenance of server farms supporting data backup and retrieval operations. Consequently, many users opt to outsource data backup and archiving to third party vendors who bear the burden of the expense of maintaining proper infrastructure. Engaging an outsourced provider of data backup and archival services, however, still can be very expensive and requires end users to acquire a certain degree of trust in the reliability and longevity of the provider. In particular, end users often lack the confidence that an outside vendor can maintain the security and confidentiality of data archived in storage controlled by the vendor.

Recognizing the difficulty of trusting third party vendors to perform data back and archival services, data backup and archival tools have been developed to disperse different files across many different servers such that the entirety of a data backup set is not entrusted within a single storage medium. As such, obtaining access to a given storage medium cannot result in corresponding access to the entire backup set. Even further, by utilizing existing servers in trusted server farms, a third party vendor providing this type of distributed data backup and archival service need not incur enormous infrastructure maintenance expense. Rather, the third party vendor need only maintain an index of where different files in a backup set can be located amongst a distributed grouping of servers. Even still, in as much as portions of the backup data set statically reside in the same location over time, data security remains partly exposed to compromise.

BRIEF SUMMARY OF THE INVENTION

Embodiments of the present invention address deficiencies of the art in respect to data backup and archival tools and provide a novel and non-obvious method, system and computer program product for the dispersal and retrieval of fragments in a peer-to-peer data backup and archival network. In an embodiment of the invention, a method for the dispersal and retrieval of fragments in a peer-to-peer data backup and archival network can include partitioning a file into multiple, different fragments for storage in a peer-to-peer data backup and archival network, selecting different peer hosts in the peer-to-peer data backup and archival network to store different ones of the fragments, and storing each of the fragments in at least one of the selected different peer hosts. Optionally, the fragments can be encrypted before storage in the different peer hosts.

In one aspect of the embodiment, partitioning a file into multiple, different fragments for storage in a peer-to-peer data backup and archival network can include partitioning a file into multiple multi-byte sized fragments for storage in a peer-to-peer data backup and archival network. In another aspect of the embodiment, storing each of the fragments in at least one of the selected different peer hosts further can include recording a location of the fragments in a master index for the file. In an alternative aspect of the embodiment, the fragments need not be stored in a master index and can be retrieved responsive to a broadcast request for the fragments to all of the different peer hosts.

In another embodiment of the invention, a peer-to-peer data backup and archival network can be configured for the dispersal and retrieval of fragments. The network can include a data backup and archival tool providing an interface for providing a file to be stored in the peer-to-peer backup and archival network. The network also can include multiple different peer hosts coupled to the tool. Finally, the network can include peer-to-peer fragment dispersal and retrieval logic coupled to each of the peer hosts. The logic can include program code enabled to respond to a request to store a fragment for the file by storing the fragment and reporting a location of the fragment to the tool.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for the dispersal and retrieval of fragments in a data backup set across different storage media in a peer-to-peer data backup and archival network. In accordance with an embodiment of the present invention, a data backup set including at least one file can be partitioned into fragments, encrypted and dispersed about different storage media in a peer-to-peer data backup and archival network. Specifically, each fragment for the file can be transmitted to one or more different hosts in the peer-to-peer data backup and archival network. A master index can be maintained for the fragments and upon retrieval, each of the fragments can be retrieved from corresponding ones of the hosts and reassembled into the file. In this way, security for archived data can be optimized while utilizing excess storage capacity in the peer-to-peer data backup and archival network.

Figure 1:
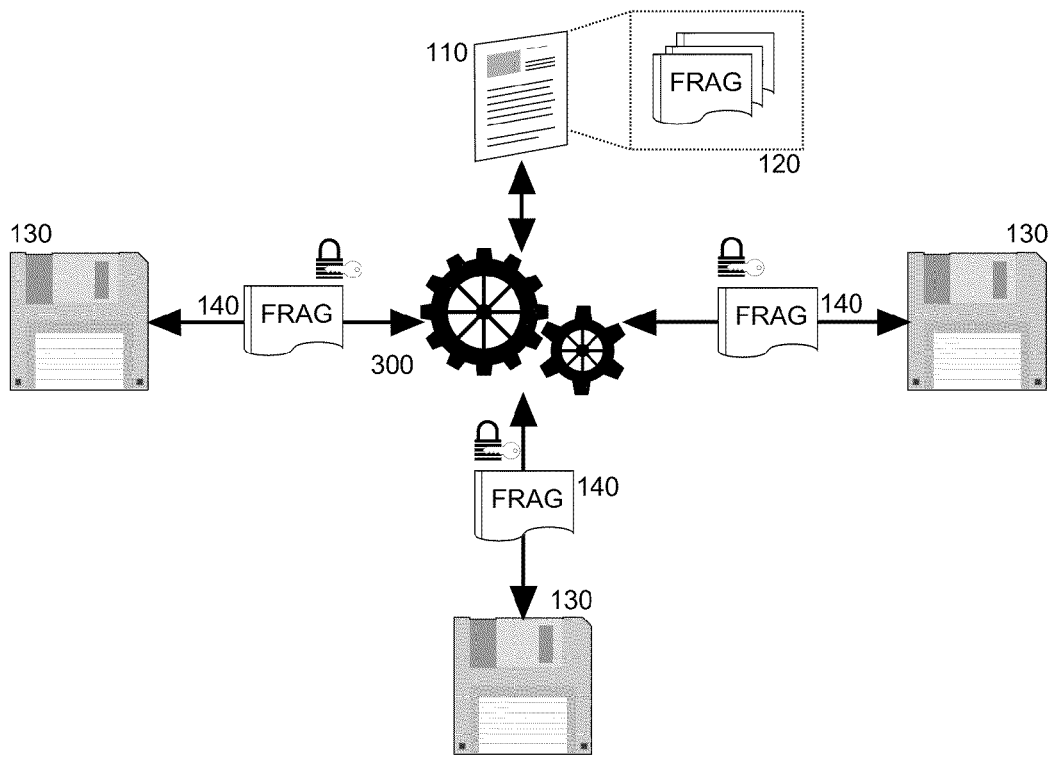
FIG. 1 is a pictorial illustration of a process for the dispersal and retrieval of fragments in a peer-to-peer data backup and archival network.

In further illustration, FIG. 1 is a pictorial illustration of a process for the dispersal and retrieval of fragments in a peer-to-peer data backup and archival network. As shown in FIG. 1, peer-to-peer fragment dispersal and retrieval program code 300 can partition a file 110 into a byte stream 120 of fragments. The program code further can encrypt the fragments in the byte stream 120 into encrypted fragments 140 and the program code can select one or more hosts 130 in a peer-to-peer data backup and archival network to store each of the encrypted fragments 140. Thereafter, each of the encrypted fragments 140 can be transmitted to the selected hosts 130 for storage. Subsequently, the file 110 can be reconstructed by retrieving a copy of each encrypted fragment 140 from a corresponding host, decrypting each encrypted fragment 140 and reassembling the byte stream 120. In this way, the social aspect of the peer-to-peer arrangement requires a minimum of investment in infrastructure cost.

Figure 2:
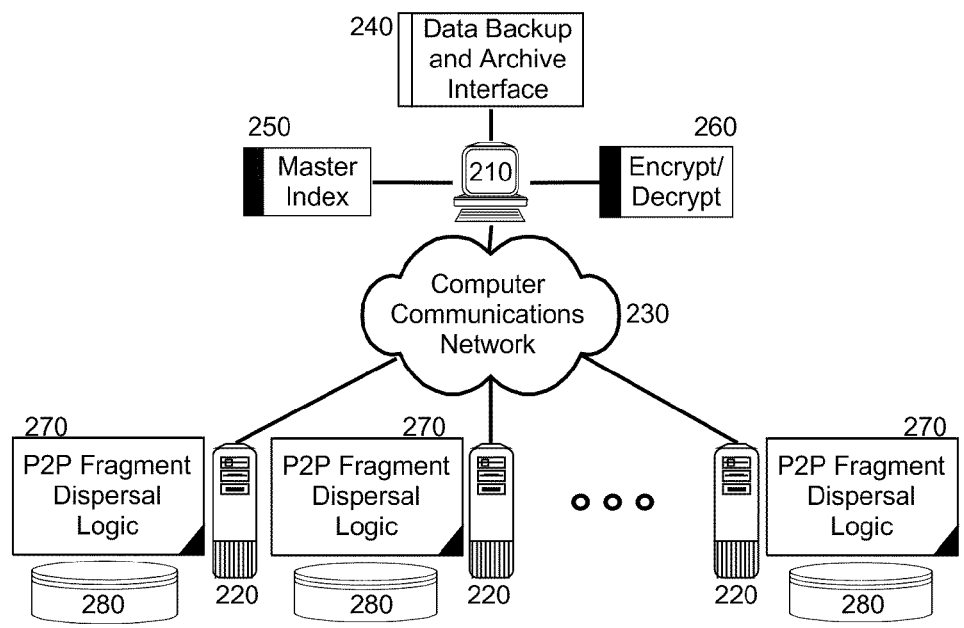
FIG. 2 is a schematic illustration of a peer-to-peer data backup and archival network configured for the dispersal and retrieval of fragments about a peer-to-peer data backup and archival network; and, FIG. 3 is a flow chart illustrating a process for dispersing fragments in a peer-to-peer data backup and archival network.

In yet further illustration, FIG. 2 is a schematic illustration of a peer-to-peer data backup and archival network configured for the dispersal and retrieval of fragments about a peer-to-peer data backup and archival network. The network can include multiple different peer hosts 220 communicatively coupled to one another in a peer-to-peer arrangement over computer communications network 230. Each of the peer hosts 220 can be coupled to a data storage medium 280 into which data fragments can be stored. Also, different peer hosts 220 can be grouped into communities of peer hosts 220. Further, each of the peer hosts 220 can support the operation of peer-to-peer fragment dispersal logic 270.

The peer-to-peer fragment dispersal logic 270 can include program code enabled to respond to requests for fragment storage issued by data backup and archive tool 210. Further, the program code of the logic 270 can be enabled to report to master index 250 a location of a fragment when successfully stored in coupled data storage medium 280. Consequently, master index 250 can provide a centralized view of a location of all fragments of a file archived about the peer-to-peer network of peer hosts 220. In this regard, the master index 250 can be included as part of the data backup and archive tool 210 communicatively coupled to each of the peer hosts 220 in the peer-to-peer network of peer hosts 220 over computer communications network 230.

Optionally, the program code of the peer-to-peer fragment dispersal logic 270 can be enabled to forego the usage of master index 250. Instead, the location of a fragment can remain unknown over time amongst the peer hosts 220 in the peer-to-peer network of peer hosts 220. As such, the program code of the peer-to-peer fragment dispersal logic 270 can be enabled to broadcast a request for retrieval when required to the peer hosts 220 and the peer hosts 220 individually can respond to the broadcast request by returning any stored fragments within the individual ones of the peer hosts 220 in the peer-to-peer network of peer hosts 220. The peer hosts 220 can be arranged hierarchically to include a root node acting as a parent to different intermediate nodes and multiple different leaf nodes acting as children to respective intermediate nodes. Each root node can be a node through which requests to store fragments of a file in other nodes can originate, but in which fragments of a file are not stored. Leaf nodes, by comparison, can only store fragments for a file, but cannot request the storage of fragments by other nodes. Finally, the intermediate nodes can both request storage of fragments of a file in other nodes, and also the intermediate nodes can store fragments for other root and intermediate nodes.

The data backup and archive tool 210 can provide an interface 240 to external users through which files can be received for archive and retrieval into the peer-to-peer network. Even further, the data backup and archive tool 210 can include encryption and decryption logic 260A such that fragments for different files can be encrypted before injection into the peer-to-peer network and decrypted upon retrieval from the peer-to-peer network. As such, an additional layer of security can be provided in encrypting the fragmented portions of a file prior to dispersal about the peer-to-peer network of peer hosts 220. Optionally, the encryption of fragments performed by encryption and decryption logic 260A can be selectively applied according to file type for the fragments such that some file types correlate to more secure encryption methods, while other file types correlate to less secure encryption methods.

Of note, periodically, a request can be broadcast to the peer hosts 220 in order to validate the integrity of data stored amongst the peer hosts 220. The broadcast request can be issued at a preset interval or on demand. Of additional note, the operation of the data backup and archive tool 210 can select subsets of the peer hosts 220—namely communities according to the identity of a requestor seeking the backup of a file. In this regard, different requestors can be associated with different communities such that files backed up through the data backup and archive tool 210 can be fragmented and dispersed into a community or communities of peer hosts 220 associated with the respectively different requestors.

Figure 3:
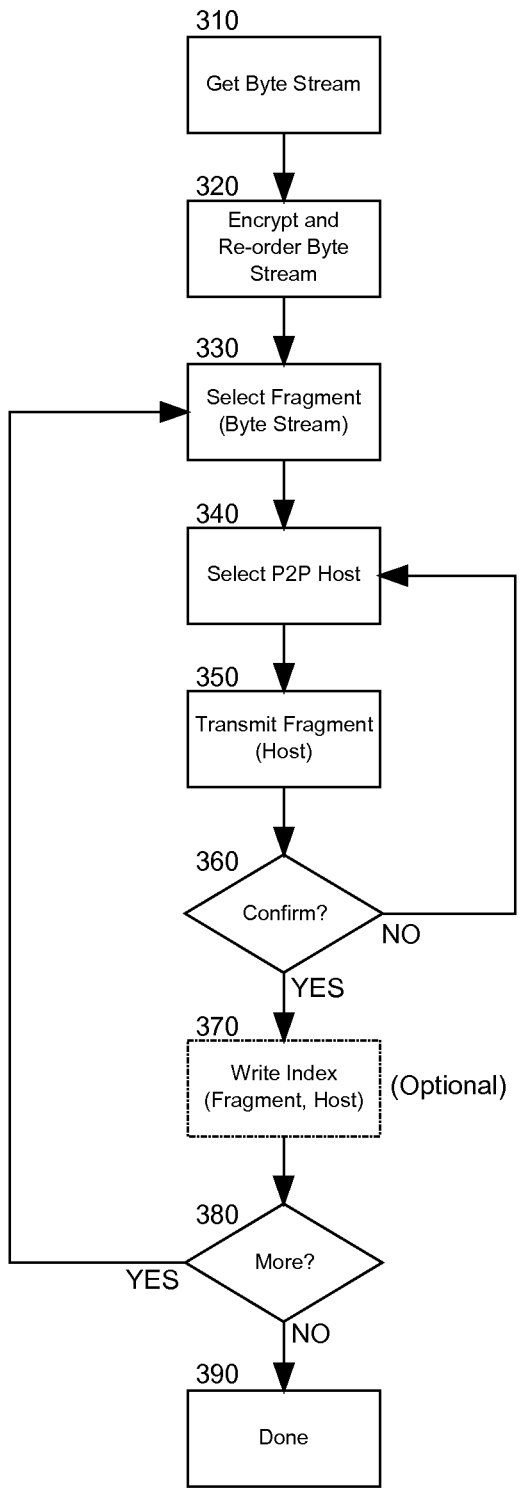

In even yet further illustration, FIG. 3 is a flow chart illustrating a process for dispersing fragments in a peer-to-peer data backup and archival network. Beginning in block 310, a byte stream can be received for dispersal about a peer-to-peer data backup and archival network. In block 320, each fragment in the byte stream can be encrypted and re-ordered and in block 330, a first fragment in the byte stream can be selected for dispersal in the peer-to-peer data backup and archival network. Thereafter, in block 340, one or more hosts in the peer-to-peer data backup and archival network can be selected to receive a copy of the selected fragment in block 350, the selected fragment can be transmitted to the selected host or hosts.

In decision block 360, if a confirmation is not received that the selected fragment has been successfully stored in the selected host or hosts, a new host can be selected to receive the selected fragment in block 340. Otherwise, in one aspect of the embodiment, in block 370 a master index entry can be written associating the selected fragment with the host or hosts storing the selected fragment in the peer-to-peer data backup and archival network. Alternatively, no master index entry need be written such that retrieval of the selected fragment can be effectuated subsequently through a broadcast request to the hosts in the peer-to-peer data backup and archival network. In decision block 380, if further fragments remain to be dispersed in the byte stream, the process can repeat through block 330. Otherwise, the process can end in block 390.

Of note, different end users can selectively use different peer-to-peer networks to store fragments of file. The selection of a peer-to-peer network for storing a file can vary according to a particular computing device used by the end user, a particular medium upon which the file is stored, a location of the end user (e.g. at work, at home or travelling), or the type of file or type of application from which the file originates. Optionally, the host of a leaf node or intermediate node can be provided sufficient credentials to retrieve the different fragments of a file stored in the leaf node by the end user. Alternatively, a third-party user can be provided sufficient credentials to retrieve the different fragments stored in the peer-to-peer network.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for the dispersal and retrieval of fragments in a peer-to-peer data backup and archival network, the method comprising:

partitioning a file into multiple, different fragments for storage in a peer-to-peer data backup and archival network;

selecting different peer hosts in the peer-to-peer data backup and archival network to store different ones of the fragments;

storing each of the fragments in at least one of the selected different peer hosts; and, broadcasting, at a periodic interval, a request to confirm an integrity of the fragments stored in the different peer hosts, the request being broadcast to the selected different peer hosts that have been selected to store different ones of the fragments, from an unselected one of the different peer hosts that has not been selected to store different ones of the fragments.

2. The method of claim 1, further comprising encrypting the fragments before storage in the different peer hosts.

3. The method of claim 2, wherein encrypting the fragments before storage in the different peer hosts, comprises encrypting the fragments before storage in the different peer hosts using an encryption method associated with a file type for the file.

4. The method of claim 1, wherein partitioning a file into multiple, different fragments for storage in a peer-to-peer data backup and archival network, comprises partitioning a file into multiple multi-byte sized fragments for storage in a peer-to-peer data backup and archival network.

5. The method of claim 1, wherein storing each of the fragments in at least one of the selected different peer hosts, further comprises recording a location of the fragments in a master index for the file.

6. The method of claim 1, wherein storing each of the fragments in at least one of the selected different peer hosts, comprises storing each of the fragments in at least one of the selected different peer hosts in a community of peer hosts associated with a requestor requesting backup of the file.

7. The method of claim 1, further comprising distributing credentials to a third party sufficient for the third party to broadcast a request to the selected different peer hosts to retrieve the fragments stored in the selected different peer hosts.

8. A peer-to-peer data backup and archival network configured for the dispersal and retrieval of fragments, the network comprising:
   a data backup and archival tool providing an interface for providing a file to be stored in the peer-to-peer backup and archival network;
   a multiplicity of peer hosts coupled to the tool; and,
   peer-to-peer fragment dispersal and retrieval logic coupled to each of the multiplicity of different peer hosts, the logic comprising program code enabled to respond to a request to store a fragment for the file by storing the fragment and reporting a location of the fragment to the tool and by broadcasting at a periodic interval from one of the different peer hosts not selected to store the fragment to another of the different peer hosts that has been selected to store the fragment, a request to the selected different peer hosts at a periodic interval to confirm an integrity of the fragments stored in the another of the different peer hosts.

9. The network of claim 8, wherein the fragments are encrypted bytes of the file.

10. The network of claim 8, wherein the peer hosts are arranged hierarchically in a hierarchy of nodes, each node corresponding to a host, each node comprising a node selected from the group consisting of a root node, an intermediate node and a leaf node, the root node issuing requests to store fragments of a file in other nodes, the intermediate node both issuing requests to store fragments of a file in other nodes and also store fragments of a file on request by other nodes, and the leaf node storing fragments of a file on request by other nodes, but not requesting storage of fragments of a file in other nodes.

11. A computer program product comprising a non-transitory computer usable storage medium storing computer usable program code for the dispersal and retrieval of fragments in a peer-to-peer data backup and archival network, the computer program product comprising:
   computer usable program code for partitioning a file into multiple, different fragments for storage in a peer-to-peer data backup and archival network;
   computer usable program code for selecting different peer hosts in the peer-to-peer data backup and archival network to store different ones of the fragments;
   computer usable program code for storing each of the fragments in at least one of the selected different peer hosts; and,
   computer usable program code for broadcasting, at a periodic interval, a request to confirm an integrity of the fragments stored in the different peer hosts, the request being broadcast to the selected different peer hosts that have been selected to store different ones of the fragments, from an unselected one of the different peer hosts that has not been selected to store different ones of the fragments.

12. The computer program product of claim 11, further comprising computer usable program code for encrypting the fragments before storage in the different peer hosts.

13. The computer program product of claim 11, wherein the computer usable program code for encrypting the fragments before storage in the different peer hosts, comprises computer usable program code for encrypting the fragments before storage in the different peer hosts using an encryption method associated with a file type for the file.

14. The computer program product of claim 11, wherein the computer usable program code for partitioning a file into multiple multi-byte sized fragments for storage in a peer-to-peer data backup and archival network, comprises computer usable program code for partitioning a file into multiple, different byte sized fragments for storage in a peer-to-peer data backup and archival network.

15. The computer program product of claim 11, wherein the computer usable program code for storing each of the fragments in at least one of the selected different peer hosts, further comprises computer usable program code for recording a location of the fragments in a master index for the file.

16. The computer program product of claim 11, wherein the computer usable program code for storing each of the fragments in at least one of the selected different peer hosts, comprises computer usable program code for storing each of the fragments in at least one of the selected different peer hosts in a community of peer hosts associated with a requestor requesting backup of the file.

17. The computer program product of claim 11, further comprising computer usable program code for distributing credentials to a third party sufficient for the third party to broadcast a request to the selected different peer hosts to retrieve the fragments stored in the selected different peer hosts.

* * * * *